United States Patent
Feichtinger (10) Patent No.: US 7,661,550 B2
(45) Date of Patent: Feb. 16, 2010

(54) FILLER NECK OF A FUEL TANK WITH AN ARRANGEMENT FOR PREVENTING INCORRECT FUELING

(75) Inventor: Stefan Feichtinger, Büchl (AT)

(73) Assignee: MAGNA STEYR Fuel Systems GesmgH, Sinabelkirchen (AT)

( * ) Notice: Subject to any disclaimer, the term of this patent is extended or adjusted under 35 U.S.C. 154(b) by 127 days.

(21) Appl. No.: 12/056,318

(22) Filed: Mar. 27, 2008

(65) Prior Publication Data

US 2008/0237231 A1    Oct. 2, 2008

(30) Foreign Application Priority Data

Mar. 27, 2007    (AT) ................ GM 196/2007 U (51) Int. Cl.
*B65D 17/00* (2006.01)
*B65D 49/00* (2006.01)
*B60K 15/00* (2006.01)
*B65D 47/00* (2006.01)
*B65D 90/22* (2006.01)

(52) U.S. Cl. ................ 220/86.2; 137/588; 141/350
(58) Field of Classification Search ............. 220/86.2; 141/350; 137/588
See application file for complete search history.

(56) References Cited

U.S. PATENT DOCUMENTS

| | | | | |
|---|---|---|---|---|
| 3,126,728 A | * | 3/1964 | Nehls | 70/169 |
| 3,730,216 A | * | 5/1973 | Arnett et al. | 137/588 |
| 5,056,570 A | * | 10/1991 | Harris et al. | 141/59 |
| 5,186,220 A | * | 2/1993 | Scharrer | 141/59 |
| 5,381,919 A | * | 1/1995 | Griffin et al. | 220/326 |
| 5,435,358 A | * | 7/1995 | Kempka et al. | 141/312 |
| 5,524,786 A | * | 6/1996 | Skudlarek | 220/262 |
| 5,732,842 A | * | 3/1998 | Krause et al. | 220/254.1 |
| 5,921,297 A | * | 7/1999 | Kremer et al. | 141/383 |
| 6,009,920 A | * | 1/2000 | Palvoelgyi et al. | 141/348 |
| 6,079,581 A | * | 6/2000 | Hashimoto et al. | 220/86.2 |
| 6,155,316 A | * | 12/2000 | Benjey | 141/348 |
| 6,230,739 B1 | * | 5/2001 | Gericke | 137/588 |
| 6,302,170 B1 | * | 10/2001 | Ott | 141/312 |
| 6,394,129 B1 | * | 5/2002 | Feichtinger et al. | 137/587 |
| 6,408,903 B1 | * | 6/2002 | Theuer et al. | 141/348 |

(Continued)

FOREIGN PATENT DOCUMENTS

EP    1 262 355 A    12/2002

(Continued)

*Primary Examiner*—Anthony Stashick
*Assistant Examiner*—Ned A Walker
(74) *Attorney, Agent, or Firm*—Bachman & LaPointe, P.C.

(57) ABSTRACT

The filler neck of a fuel tank with an arrangement for preventing incorrect fueling has a rotatable ring and closing elements which are actuated by said ring, with a transmission device having the following features being arranged between the movable part and the rotatable ring:
  there are two slides which are situated opposite one another and which have run-on faces which face toward one another in the support body,
  the two slides are connected to one another by means of a rigid bar, which rigid bar is movably articulatedly connected with its first end to the first slide and with its second end to the second slide,
  the second end of the bar is a bolt which engages into a first slot of the second slide and into a second slot of the rotatable ring.

10 Claims, 10 Drawing Sheets

U.S. PATENT DOCUMENTS

| | | | |
|---|---|---|---|
| 6,446,826 B1 * | 9/2002 | Foltz et al. | 220/86.2 |
| 6,474,376 B2 * | 11/2002 | Hagano et al. | 141/350 |
| 6,539,990 B1 * | 4/2003 | Levey et al. | 141/301 |
| 6,637,477 B1 * | 10/2003 | Maier | 141/350 |
| 6,681,817 B2 * | 1/2004 | Hagano et al. | 141/348 |
| 6,691,750 B1 * | 2/2004 | Foltz | 141/350 |
| 6,705,481 B2 * | 3/2004 | Temmesfeld | 220/86.2 |
| 6,789,586 B2 * | 9/2004 | Levey | 141/350 |
| 6,880,594 B1 * | 4/2005 | Benjey | 141/350 |
| 6,945,290 B1 * | 9/2005 | Benjey et al. | 141/302 |
| 6,968,874 B1 * | 11/2005 | Gabbey et al. | 141/349 |
| 6,983,773 B1 * | 1/2006 | Hagano et al. | 141/350 |
| 7,011,121 B2 * | 3/2006 | Bar et al. | 141/350 |
| 7,063,113 B2 * | 6/2006 | Ropert et al. | 141/350 |
| 7,077,178 B2 * | 7/2006 | Hedevang | 141/367 |
| 7,147,018 B2 * | 12/2006 | Krach et al. | 141/301 |
| 7,163,037 B2 * | 1/2007 | Walkowski | 141/350 |
| 7,165,583 B1 * | 1/2007 | Walkowski et al. | 141/350 |
| 7,293,586 B2 * | 11/2007 | Groom et al. | 141/350 |
| 7,302,977 B2 * | 12/2007 | King et al. | 141/367 |
| 2002/0088801 A1 * | 7/2002 | Temmesfeld | 220/86.2 |
| 2003/0056837 A1 * | 3/2003 | Benjey | 137/587 |
| 2004/0163732 A1 * | 8/2004 | Gramss et al. | 141/350 |
| 2005/0082288 A1 * | 4/2005 | Krach et al. | 220/86.2 |
| 2005/0155671 A1 * | 7/2005 | McClung et al. | 141/350 |
| 2005/0199315 A1 * | 9/2005 | Scharrer | 141/350 |
| 2006/0032552 A1 * | 2/2006 | Hedevang | 141/367 |
| 2006/0162813 A1 * | 7/2006 | Walkowski | 141/350 |
| 2006/0289083 A1 * | 12/2006 | Bar | 141/350 |
| 2007/0000574 A1 * | 1/2007 | DeCapua et al. | 141/350 |
| 2007/0034287 A1 * | 2/2007 | Groom et al. | 141/350 |
| 2007/0125444 A1 * | 6/2007 | Hagano et al. | 141/350 |
| 2007/0261742 A1 * | 11/2007 | Pozgainer | 137/588 |
| 2007/0267099 A1 * | 11/2007 | Stephan et al. | 141/350 |
| 2008/0092986 A1 * | 4/2008 | Buchgraber | 141/350 |
| 2008/0178962 A1 * | 7/2008 | Baudoux et al. | 141/350 |
| 2009/0001077 A1 * | 1/2009 | Feichtinger | 220/86.2 |

FOREIGN PATENT DOCUMENTS

| | | |
|---|---|---|
| EP | 1 284 212 A | 2/2003 |
| EP | 1 712 398 A | 10/2006 |
| FR | 2 762 807 A | 11/1998 |

* cited by examiner

FILLER NECK OF A FUEL TANK WITH AN ARRANGEMENT FOR PREVENTING INCORRECT FUELING

BACKGROUND OF THE INVENTION

The invention relates to the filler neck of a fuel tank with an arrangement for preventing incorrect fueling, composed of a neck body, at least one part which can be moved counter to a spring force by inserting the filler pipe of the correct diameter, a rotatable ring and closing elements which are actuated by said ring, with a transmission device being arranged between the movable part and the rotatable ring.

In motor vehicles with a diesel engine, the risk of incorrect fueling is high because the diameter of the filler pipe of a fueling nozzle for unleaded gasoline is smaller than that of a fueling nozzle for diesel fuel. The correct diameter is therefore the larger diameter, and the following invention concerns very reliably preventing the insertion of a smaller filler pipe into a larger hole.

It is known from EP 1 284 212 B1 for a tube piece which is movable in the longitudinal direction and which has a constriction at the tank side to be provided in the filler pipe, the diameter of which constriction is smaller than that of a filler pipe for diesel fuel but is larger than that of a filler pipe for gasoline. Said tube piece acts via a slotted guide on the closing elements, either directly on movable closing elements or via a rotatable tube piece which surrounds said tube piece.

Said safety device fails, however, if the filler pipe is inserted obliquely, or can be circumvented by pressing laterally on the filler pipe. On account of the guide length required for the two tube pieces, the spatial requirement of a filler neck of said type in the longitudinal direction is considerable and the attachment of further fittings, such as for example valves and branches for escaping fuel vapors, is difficult if not impossible.

SUMMARY OF THE INVENTION

The object on which the invention is based is therefore that of providing absolutely reliable protection against incorrect fueling with a reduced installation length and unhindered attachment of additional valves or the like.

According to the invention, this is achieved by means of the characterizing features of the independent claim. The two slides which are arranged opposite one another are movable independently of one another. If only one is moved, or both slides are moved only slightly, then the closing elements remain closed. Only when the "correct" filler pipe is inserted, and therefore when the oblique run-on faces are acted on at the same time, are both of the slides moved far enough at the same time, and only then are the closing elements opened. Said selective action is based on the rigid bar which connects the two slides while engaging around the filler opening and which interacts with one of the slides via a slotted guide. Said slotted guide and a further slotted guide between the bar and the rotatable ring forms the transmission device which produces the positive connection between the slides and the closing elements.

Here, the slots offer the advantage that, by means of their profile, a favorable profile of the opening and closing forces is also obtained. The first slot preferably runs obliquely with respect to the sliding direction of the second slide, and the second slot preferably runs approximately in the sliding direction, that is to say radially, and the rigid bar preferably has, at its second end, a bolt which interacts with the two slots.

The closing elements can be of very varied design within the context of the invention. They can either act on a (in this case incorrectly) so-called unleaded flap which prevents an insertion of the incorrect filler pipe, or can achieve this without an unleaded flap. Here, the closing elements can be movable locking elements or pivotable parts. If they are pivotable parts (at least two or in greater numbers in the manner of an iris diaphragm), then a third slotted guide can be provided for this purpose.

DETAILED DESCRIPTION

Figure 1:
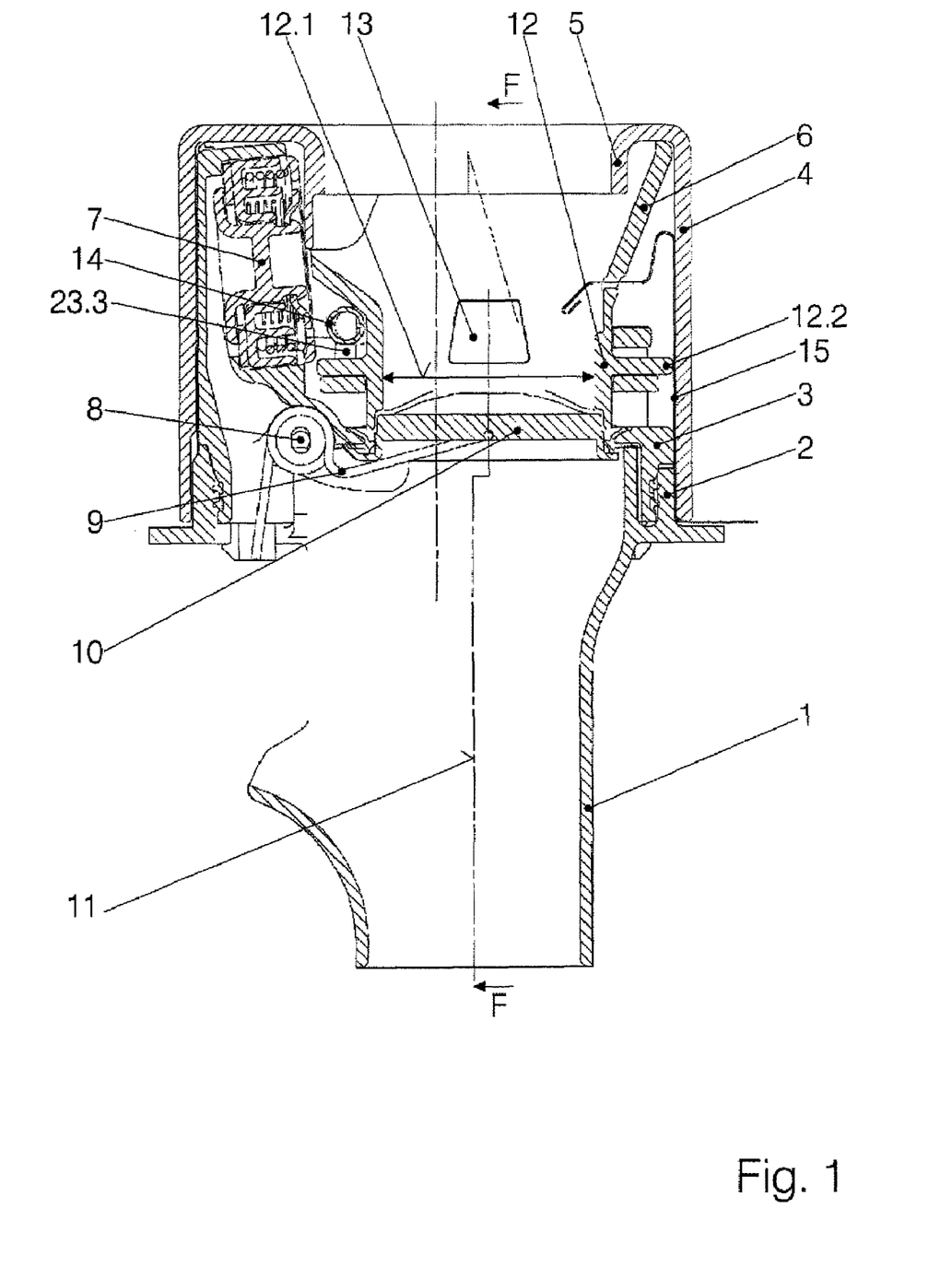
FIG. 1: a longitudinal section through a filler neck according to the invention.

In FIG. 1, the support body is formed by a pipe piece 1 having a flange 2, a latch 3, an attachment 4 with a flanged edge 5, and an inlet funnel 6 which runs out downward into a hollow cylinder 12. The latch 3 holds a flap 10 which can be pivoted up counter to the force of a hairpin spring 9 about an axle 8, and laterally, a valve 7, for example an overpressure valve. Said latch 3 and the attachment 4 are fastened to the flange 2. The hollow cylinder 12 serves to guide a filler pipe (not illustrated) of a fueling nozzle. The filler pipe has the standard diameter for diesel fuel, which is greater than that of a filler pipe for unleaded gasoline. The latter is also referred to as an "incorrect" filler pipe. The hollow cylinder 12 has the diameter 12.1 which allows the "correct" filler pipe to pass through. Furthermore, the hollow cylinder 12 is surrounded by a flange 12.2 on which the device according to the invention for preventing incorrect fueling is arranged. The associated tension spring, a tube spring 14 which surrounds the hollow cylinder 12, already belongs to said device. This is also true of one of the two windows 13, which are situated opposite one another, in the hollow cylinder 12. The imaginary axis and insertion direction of a filler pipe is denoted by 11. A conductor 15 dissipates electrostatic charges.

Figure 2:
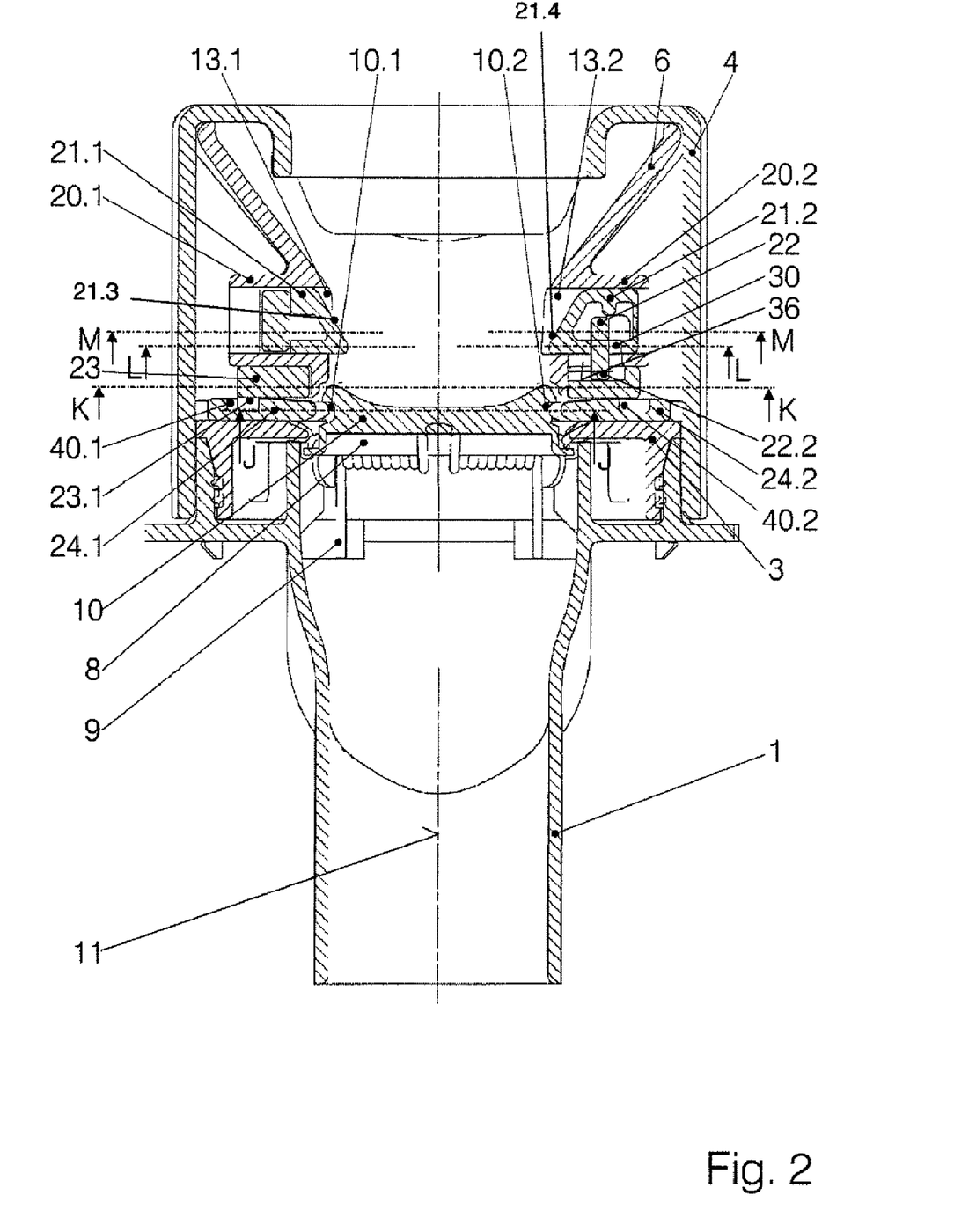
FIG. 2: a longitudinal section as per F-F in FIG. 1,
FIG. 3: a cross section as per M-M in FIG. 2,
FIG. 4: a cross section as per L-L in FIG. 2,
FIG. 5: a cross section as per K-K in FIG. 2,
FIG. 6: a cross section as per J-J in FIG. 2,
FIG. 7: as FIG. 2, but in the blocking position.

FIG. 2 shows the parts 20-24 of the protective device. Their shape and their interaction will however first become apparent on the basis of the cross sections in FIGS. 3 and 6, which are discussed further below. The windows 13.1, 13.2, which are situated opposite one another, of the hollow cylinder are slide guides 20.1, 20.2 in which a first and a second slide 21.1, 21.2 are guided in a radial direction in a plane normal to the axis 11. The slides 21.1, 21.2 and their guides have a rectangular cross section and oblique run-on faces 21.3, 21.4 which, in their base position (see FIG. 7), project into the hollow cylinder 12.

The slides 21.1, 21.2 are connected to one another by means of a rigid (or at least stiff) bar 22 which engages around the hollow cylinder 12. One end of the bar 22 is pivotably mounted in the first slide 21.1 by means of an axially parallel pin 22.1; the other end is pivotably and movably mounted in the second slide by means of a bolt 22.2 which is likewise axially parallel. Said bolt 22.2 interacts with a rotatable ring 23 which is arranged under the slides 21.1, 21.2 and which itself again interacts with radially movable locking elements 24.1, 24.2 which are likewise situated below said slides 21.1, 21.2 in an axially normal plane, and which locking elements 24.1, 24.2 lock the flap 10.

Figure 3:
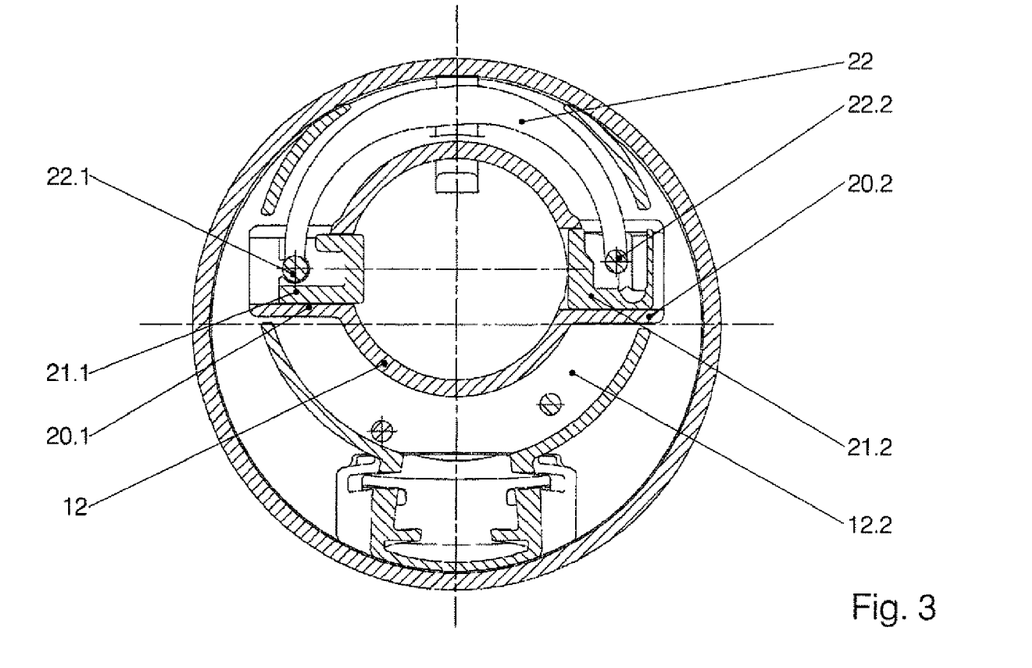

FIG. 3 shows, in cross section, the hollow cylinder 12 with the radial slide guides 20.1, 20.2 which are aligned with one another. The two slides 21.1 and 21.2 are connected to one another by means of the rigid bar 22. The spacing between the pin 22.1 at one end of the bar 22 and the bolt 22.2 at the other end is therefore constant. For as long as the two slides are moved in the same direction and by the same distance, the position of the bar 22, and therefore of the parts (pin 22.1 and bolt 22.2) which are attached to its ends, with respect to the slides 21.1, 21.2 does not change. This occurs if an "incorrect" (excessively small) filling pipe is inserted.

Figure 4:
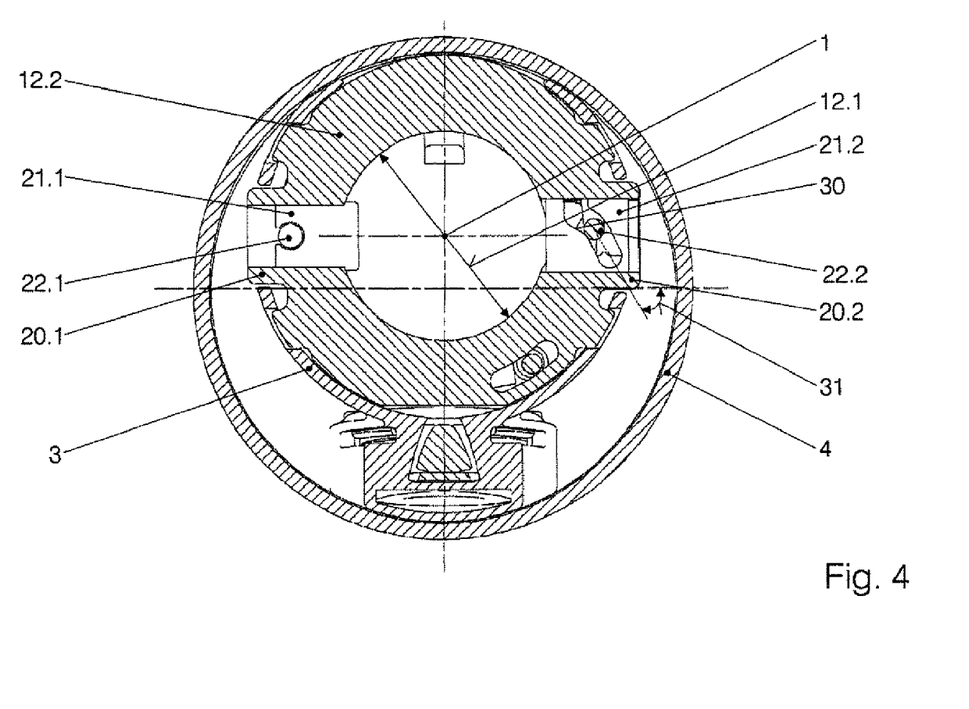

FIG. 4 shows how the other end of the bar 22 is pivotably and movably mounted by means of the axially parallel bolt 22.2 in the second slide 21.2. For this purpose, a first slot 30 is provided in the slide 21.2, into which slot 30 the bolt 22.2 of the bar 22 engages. The slot encloses an angle 31 with the radius. The slot 30 need not run straight; it can, as in FIG. 4, follow a curve, as a result of which the force profile is varied in a desired way. When a filling pipe with the "correct" diameter (close to 12.1) is inserted, the two slides 21.1, 21.2 are moved away from one another. Here, the bolt 22.2 of the bar 22 is moved in the peripheral direction through the first slot 30. The bolt 22.2 projects through the slot 30 downward into the rotatable ring 23 (see FIG. 2) and rotates the latter about the axis 11.

Figure 5:
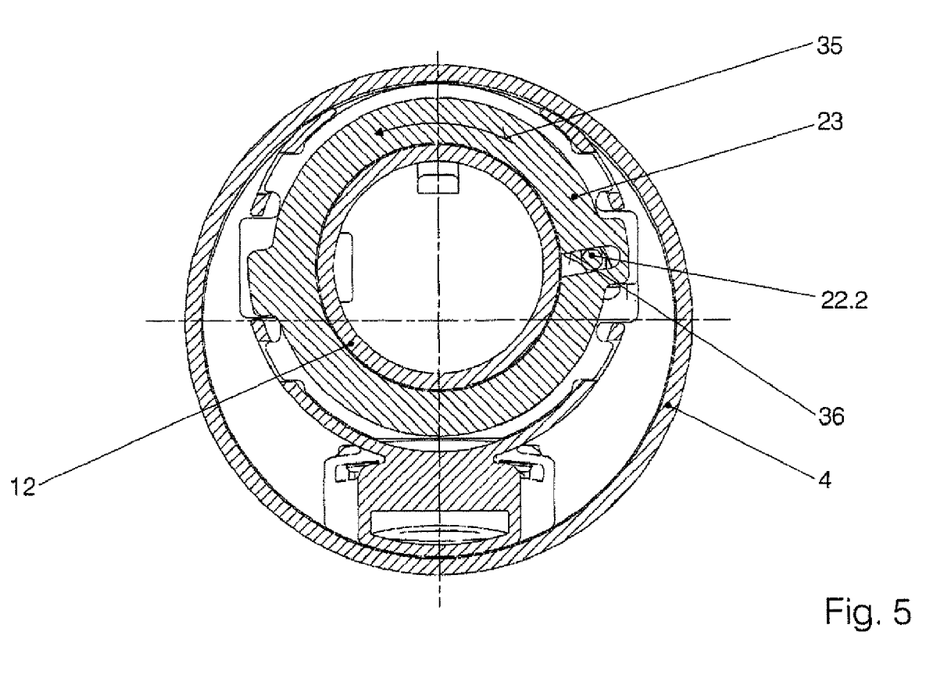

This can be seen in FIG. 5. The rotatable ring 23 surrounds the hollow cylinder 12, is effectively mounted on the latter and is rotated by the bolt 22.2, in this case in the direction of the arrow 35. For this purpose, the bolt 22.2 engages into a second slot 36, because its distance from the axis 11 changes when the slides 21.1, 21.2 move. The second slot 36 runs virtually radially, because it must permit said displacement. As a result of the slight inclination with respect to the radius, kinematic corrections are possible. The tube spring 14 merely indicated in FIG. 1 engages with its one end on the rotatable ring 23 and with the other end on the hollow cylinder 12.

Figure 6:
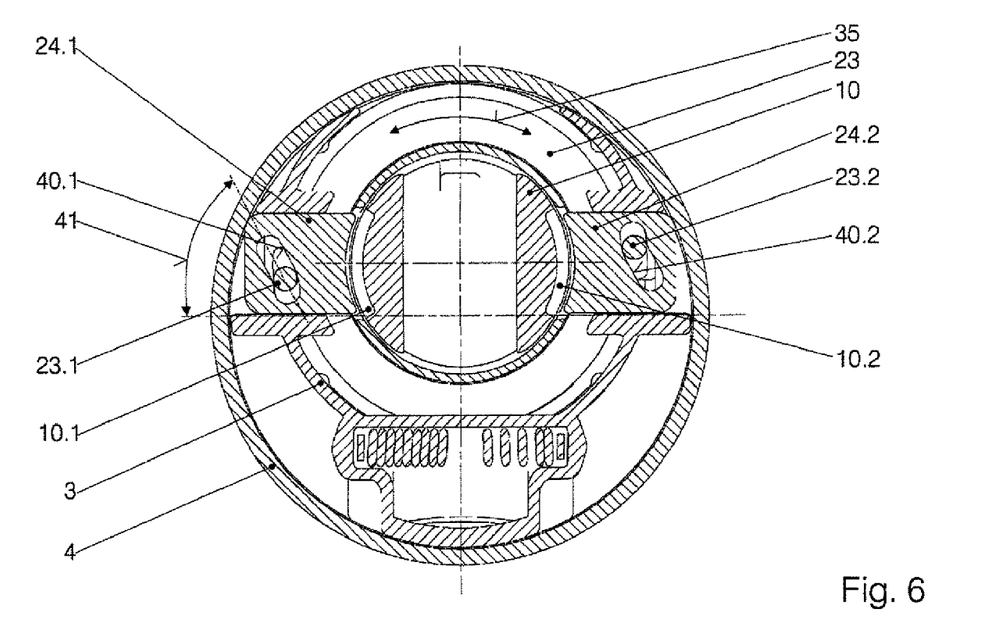
Figure 7:
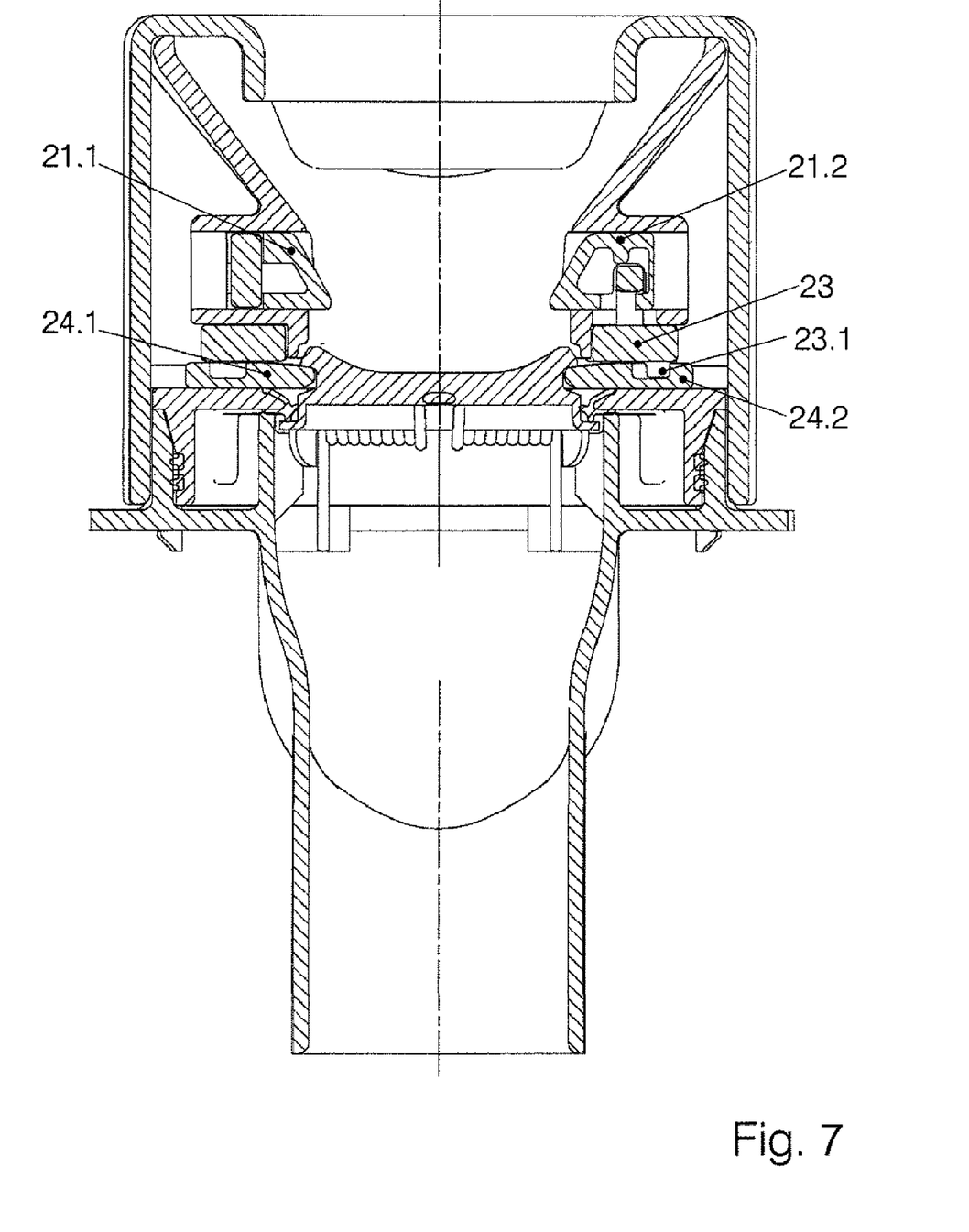
Figure 8:
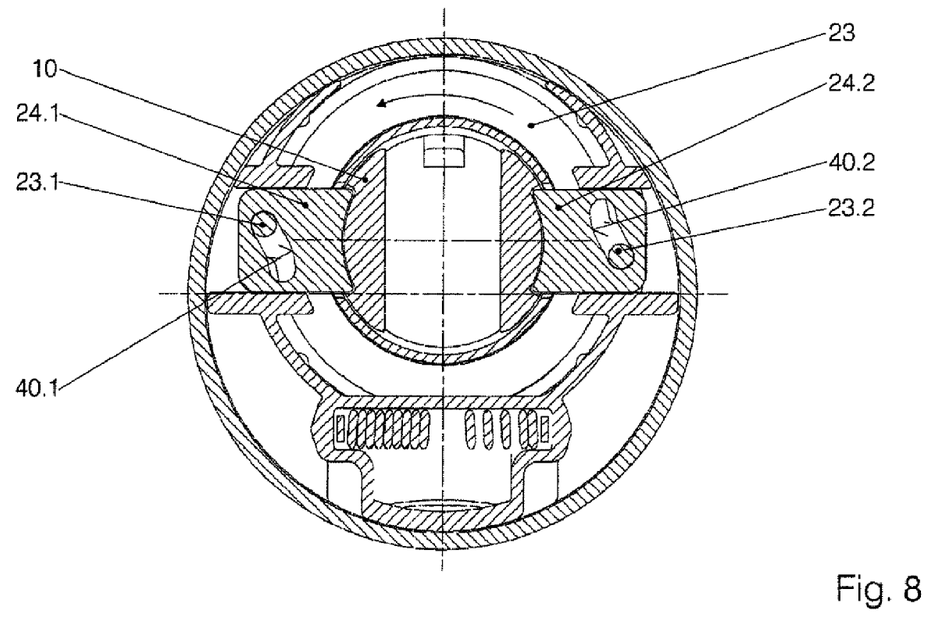
FIG. 8: as FIG. 6, but in the blocking position.

FIG. 6 shows a way of converting the rotation of the ring 23 into an access block for an "incorrect" filler pipe. Two pins 23.1, 23.2 (there may also be more than two) are arranged on the underside of the rotatable ring 23, which pins 23.1, 23.2 engage into third slots 40.1, 40.2 of a first and of a second locking element 24.1, 24.2. The locking elements are guided on the latch 3 so as to be aligned with one another in the radial direction. In the closed position (see FIG. 8), said locking elements engage into grooves 10.1, 10.2 at the edge of the flap 10, and lock the latter. In FIG. 6, the flap is permitted to be pushed open by the "correct" filler pipe. Here, the third slot runs rectilinearly at an angle 41 with respect to the radius. FIGS. 7 and 8 correspond to FIGS. 2 and 6, showing the same but with the flap 10 locked.

Figure 9:
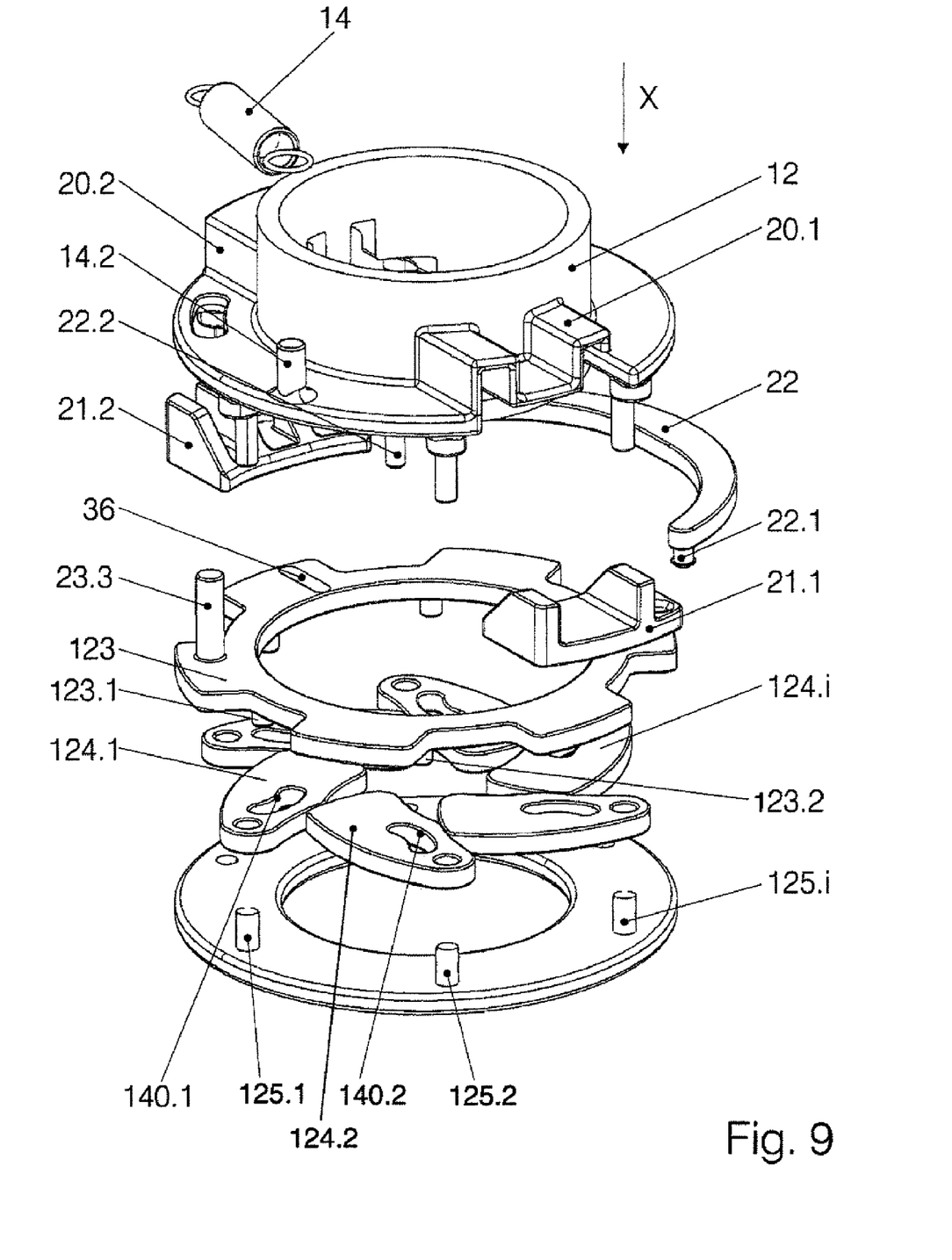
FIG. 9: exploded illustration of a modified embodiment.
Figure 10:
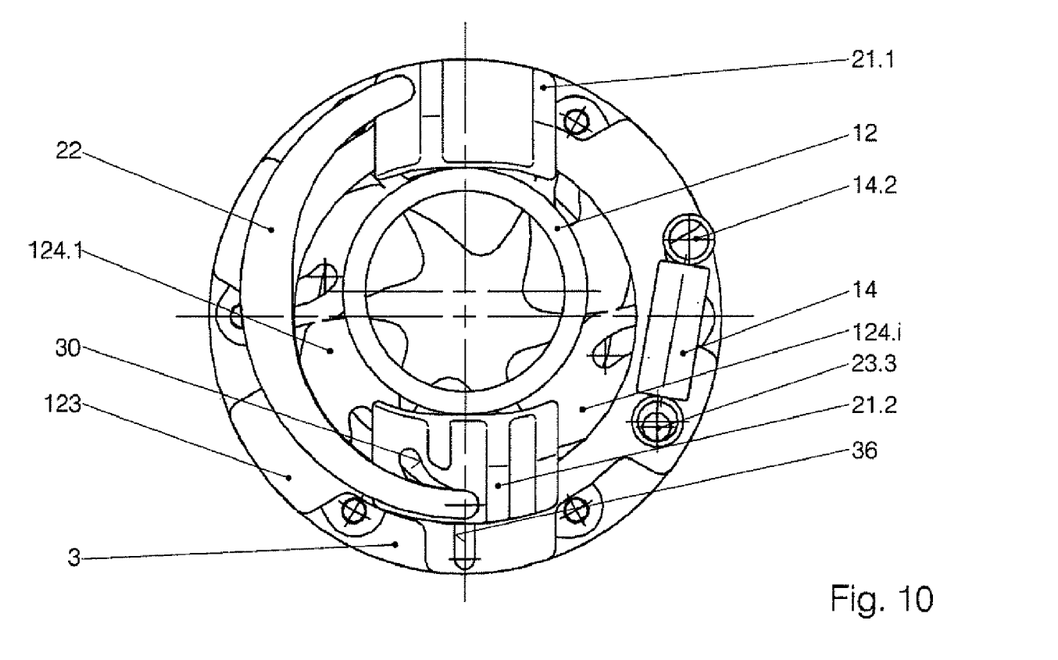
FIG. 10: plan view as per X in FIG. 9.

The variant of FIGS. 9 and 10 differs from that described above merely by the way of converting the rotation of the ring 23 into an access block for an "incorrect" filler pipe. All the other parts do not differ and are therefore provided with the reference symbols of FIGS. 1 to 8. The tube spring 14 which is merely indicated in FIG. 1 exerts a tangential force between the pin 14.2 and the pin 23.3 on the rotatable ring 23, which tangential force seeks to place the ring 23 into the blocked position.

The reference symbols of other parts are increased by 100. In the exploded illustration of FIG. 9, the rotatable ring 123 has, on its underside, a number of pins 123.1, 123.2, 123.i which engage into third slots 140.1, 140.2, 140.i. Said third slots 140.1, 140.2, 140.i are milled into parts 124.1, 124.2, 124.i which are pivotable about axles 125.1, 125.2, 125.i which are fixed to the housing. Said parts, in the illustrated number, form closing elements which act directly in the manner of an iris diaphragm. They therefore do not lock a flap but rather themselves form the closing elements.

The invention claimed is:

1. Filler neck of a fuel tank with an arrangement for preventing incorrect fueling, comprising a neck body, at least one movable part which can be moved counter to a spring force by inserting a filler pipe of the correct diameter, a rotatable ring and closing elements which are actuated by said ring, with a transmission device being arranged between the at least one movable part and the rotatable ring, wherein
   a) the at least one movable part comprises two movable parts which are situated and are movable in an axially normal plane are arranged substantially opposite one another in the neck body, wherein the two movable parts are a first and a second slide with run-on faces which face toward one another, wherein the first and second slide are displaced outward when the filler pipe with the correct diameter is inserted,
   b) the two slides are connected to one another by means of a rigid bar, wherein the rigid bar is movably articulatedly connected with its first end to the first slide and with its second end to the second slide,
   c) the transmission device is composed of the rigid bar, a first slotted guide between the first slide and the rigid bar, and a second slotted guide between the rigid bar and the rotatable ring, with the slots running in the axially normal plane.

2. Filler neck according to claim 1, wherein the first slot runs at an angle with respect to the sliding direction of the second slide, and the second slot runs approximately in the sliding direction.

3. Filler neck according to claim 1, wherein the rigid bar has, at its second end, a bolt which interacts with the two slots.

4. Filler neck according to claim 1, wherein the closing elements which are actuated by the rotatable ring are a number of locking elements which interact with a flap which is arranged inward toward the tank from the slide.

5. Filler neck according to claim 4, wherein the locking elements are parts which are movable in opposite directions in an axially normal plane and which interact with the rotatable ring by means of three slotted guides.

6. Filler neck according to claim 4, wherein the locking elements are parts which are pivotable in an axially normal plane about an axle which is fixed to the housing, and which interact with the rotatable ring by means of third slotted guides.

7. Filler neck according to claim 1, wherein the closing elements which are actuated by the rotatable ring are a number of parts which are pivotable in an axially normal plane about an axle which is fixed to the housing, and which interact with the rotatable ring by means of third slotted guides.

8. Filler neck according to claim 5, wherein the third slotted guides comprise a slot on the locking element and a pin on the rotatable ring.

9. Filler neck according to claim 6, wherein the third slotted guides comprise a slot on the locking element and a pin on the rotatable ring.

10. Filler neck according to claim 1, wherein the closing elements which are actuated by the rotatable ring are two locking elements which interact with a flap which is arranged inward toward the tank from the slide.

* * * * *